United States Patent
Yedluri et al.

(10) Patent No.: US 11,757,634 B2
(45) Date of Patent: Sep. 12, 2023

(54) SYSTEM FOR SECURE CLIENT-SIDE CRYPTOGRAPHIC KEY RETRIEVAL USING CRYPTOGRAPHIC KEY SPLITTING AND WRAPPING

(71) Applicant: BANK OF AMERICA CORPORATION, Charlotte, NC (US)

(72) Inventors: Praveen Chakravarthy Yedluri, Hyderabad (IN); Goli Vittal Surya Narayana, Hyderabad (IN)

(73) Assignee: BANK OF AMERICA CORPORATION, Charlotte, NC (US)

( * ) Notice: Subject to any disclaimer, the term of this patent is extended or adjusted under 35 U.S.C. 154(b) by 276 days.

(21) Appl. No.: 17/217,017

(22) Filed: Mar. 30, 2021

(65) Prior Publication Data
US 2022/0321339 A1 Oct. 6, 2022

(51) Int. Cl.
*H04L 9/08* (2006.01)
*H04L 9/06* (2006.01)

(52) U.S. Cl.
CPC .......... *H04L 9/0894* (2013.01); *H04L 9/0643* (2013.01); *H04L 9/085* (2013.01); *H04L 9/0822* (2013.01); *H04L 9/0869* (2013.01); *H04L 9/0877* (2013.01)

(58) Field of Classification Search
CPC ......... H04L 9/08; H04L 9/085; H04L 9/0816; H04L 9/0869; H04L 9/0822; H04L 9/0838; H04L 9/0871; H04L 9/0894; H04L 9/14; H04L 9/0643; H04L 63/06; H04L 63/04; H04L 63/045; H04L 63/0478
See application file for complete search history.

(56) References Cited

U.S. PATENT DOCUMENTS

| | | | |
|---|---|---|---|
| 7,325,127 B2 | 1/2008 | Olkin et al. | |
| 7,711,120 B2 | 5/2010 | Kimmel et al. | |
| 7,765,310 B2 | 7/2010 | Graveline et al. | |
| 7,844,829 B2 | 11/2010 | Meenakshisundaram | |
| 8,006,307 B1 | 8/2011 | Klebe | |
| 8,009,829 B2 | 8/2011 | Jueneman et al. | |
| 8,213,620 B1 | 7/2012 | Sussland et al. | |
| 8,261,075 B2 | 9/2012 | Rubin | |
| 8,494,969 B2 | 7/2013 | Dickinson et al. | |
| 9,215,218 B2 | 12/2015 | OHare et al. | |
| 9,397,827 B2 | 7/2016 | OHare et al. | |
| 9,443,097 B2 | 9/2016 | OHare et al. | |
| 9,954,680 B1 * | 4/2018 | Machani | H04L 9/0825 |
| 10,356,088 B1 | 7/2019 | Peddada et al. | |
| 10,615,969 B1 * | 4/2020 | Griffin | H04L 9/0825 |
| 10,783,269 B1 | 9/2020 | Shraer et al. | |

(Continued)

*Primary Examiner* — Shaqueal D Wade-Wright
(74) *Attorney, Agent, or Firm* — Moore & Van Allen PLLC; Seongun M. Hong

(57) ABSTRACT

A system is provided for secure client-side cryptographic key retrieval using cryptographic key splitting and wrapping. In particular, the system may generate an encryption key that may be wrapped using a wrapping key. The wrapping key may in turn be split into a plurality of parts that may be stored in a distributed manner on a client computing system and a cryptographic database. Furthermore, the wrapping key may be generated using an encryption algorithm that allows the wrapping key to be reconstituted with fewer than all of the plurality of parts. In this way, the system provides a secure way to restrict access to sensitive data to authorized parties.

15 Claims, 3 Drawing Sheets

(56) References Cited

U.S. PATENT DOCUMENTS

| | | |
|---|---|---|
| 10,846,411 B2 | 11/2020 | Horowitz et al. |
| 11,025,596 B1 | 6/2021 | Chevallier-Mames et al. |
| 11,664,982 B2 * | 5/2023 | Gryb .................. H04L 9/085 |
| | | 713/168 |
| 2003/0174840 A1 | 9/2003 | Bogan |
| 2003/0210791 A1 | 11/2003 | Binder |
| 2007/0186095 A1 | 8/2007 | Ganesan et al. |
| 2007/0276951 A1 | 11/2007 | Riggs et al. |
| 2014/0189358 A1 | 7/2014 | Grimen et al. |
| 2019/0230072 A1 | 7/2019 | Murray |
| 2020/0119917 A1 * | 4/2020 | Christensen ............ H04L 9/30 |
| 2022/0283794 A1 * | 9/2022 | Wolfson ............... H04L 9/0822 |

\* cited by examiner

200

```
RECEIVE A REQUEST, FROM A CLIENT COMPUTING SYSTEM, FOR A
WRAPPING KEY SPLIT
201
              ↓
GENERATE, USING A HARDWARE SECURITY MODULE, AN
ENCRYPTION KEY ASSOCIATED WITH THE CLIENT COMPUTING
SYSTEM AND A WRAPPING KEY
202
              ↓
SPLIT THE WRAPPING KEY INTO A PLURALITY OF WRAPPING KEY
PARTS USING A CRYPTOGRAPHIC ALGORITHM
203
              ↓
TRANSMIT A FIRST WRAPPING KEY PART FROM THE PLURALITY OF
WRAPPING KEY PARTS TO THE CLIENT COMPUTING SYSTEM
204
              ↓
STORE A SECOND WRAPPING KEY PART AND A THIRD WRAPPING
KEY PART FROM THE PLURALITY OF WRAPPING KEY PARTS IN A
CRYPTOGRAPHIC DATABASE
205
```

```
┌─────────────────────────────────────────────────────────────┐
│ RECEIVE A REQUEST, FROM A CLIENT COMPUTING SYSTEM, FOR      │
│              ACCESS TO THE ENCRYPTION KEY                    │
│                           301                                │
└─────────────────────────────────────────────────────────────┘
                              │
                              ▼
┌─────────────────────────────────────────────────────────────┐
│ RETRIEVE THE PLURALITY OF WRAPPING KEY PARTS AND THE        │
│   ENCRYPTION KEY FROM THE CRYPTOGRAPHIC DATABASE            │
│                           302                                │
└─────────────────────────────────────────────────────────────┘
                              │
                              ▼
┌─────────────────────────────────────────────────────────────┐
│   RECONSTRUCT THE WRAPPING KEY FROM THE SECOND              │
│   WRAPPING KEY PART AND THE THIRD WRAPPING KEY PART         │
│                           303                                │
└─────────────────────────────────────────────────────────────┘
                              │
                              ▼
┌─────────────────────────────────────────────────────────────┐
│  ENCRYPT THE ENCRYPTION KEY USING THE WRAPPING KEY TO       │
│          GENERATE A WRAPPED ENCRYPTION KEY                   │
│                           304                                │
└─────────────────────────────────────────────────────────────┘
                              │
                              ▼
┌─────────────────────────────────────────────────────────────┐
│ TRANSMIT THE WRAPPED ENCRYPTION KEY AND AT LEAST ONE OF     │
│  THE SECOND WRAPPING KEY PART AND THE THIRD WRAPPING        │
│       KEY PART TO THE CLIENT COMPUTING SYSTEM                │
│                           305                                │
└─────────────────────────────────────────────────────────────┘
```

FIG. 3

SYSTEM FOR SECURE CLIENT-SIDE CRYPTOGRAPHIC KEY RETRIEVAL USING CRYPTOGRAPHIC KEY SPLITTING AND WRAPPING

FIELD OF THE INVENTION

The present disclosure embraces a system for secure client-side cryptographic key retrieval using cryptographic key splitting and wrapping.

BACKGROUND

There is a need for a way to secure and protect electronic data.

BRIEF SUMMARY

The following presents a simplified summary of one or more embodiments of the invention in order to provide a basic understanding of such embodiments. This summary is not an extensive overview of all contemplated embodiments and is intended to neither identify key or critical elements of all embodiments, nor delineate the scope of any or all embodiments. Its sole purpose is to present some concepts of one or more embodiments in a simplified form as a prelude to the more detailed description that is presented later.

A system is provided for secure client-side cryptographic key retrieval using cryptographic key splitting and wrapping. In particular, the system may generate an encryption key that may be wrapped using a wrapping key. The wrapping key may in turn be split into a plurality of parts that may be stored in a distributed manner on a client computing system and a cryptographic database. Furthermore, the wrapping key may be generated using an encryption algorithm that allows the wrapping key to be reconstituted with fewer than all of the plurality of parts. Accordingly, upon receiving a key retrieval request, the system may reconstitute the wrapping key from the cryptographic database and wrap the encryption key using the reconstituted wrapping key. The system may then send the wrapped encryption key to the client computing system along with one part of the plurality of parts of the wrapping key, thereby allowing the client computing system to reconstitute the wrapping key and access the encryption key therein. In this way, the system provides a secure way to restrict access to sensitive data to authorized parties.

Accordingly, embodiments of the present disclosure provide a system for secure client-side cryptographic key retrieval using cryptographic key splitting and wrapping, the system comprising a memory device with computer-readable program code stored thereon; a communication device; and a processing device operatively coupled to the memory device and the communication device, wherein the processing device is configured to execute the computer-readable program code to receive a request from a client computing system for a wrapping key split; generate, using a hardware security module, an encryption key associated with the client computing system and a wrapping key; split the wrapping key into a plurality of wrapping key parts using a cryptographic algorithm, the plurality of wrapping key parts comprising a first wrapping key part, a second wrapping key part, and a third wrapping key part; transmit the first wrapping key part to the client computing system; and store the second wrapping key part and the third wrapping key part in a cryptographic database.

In some embodiments, the computer-readable program code further causes the processing device to receive a request from the client computing system for access to the encryption key; retrieve the second wrapping key part and the third wrapping key part from the cryptographic database; reconstruct the wrapping key from the second wrapping key part and the third wrapping key part; encrypt the encryption key using the wrapping key to generate a wrapped encryption key; and transmit the wrapped encryption key and at least one of the second wrapping key part and the third wrapping key part to the client computing system.

In some embodiments, the client computing system is configured to reconstruct a client-side wrapping key from the first wrapping key part and the second wrapping key part; and decrypt the wrapped encryption key using the client-side wrapping key.

In some embodiments, generating the encryption key comprises inputting one or more random bytes and a base key associated with the client computing system into a hash algorithm.

In some embodiments, the second wrapping key part and the third wrapping key part are stored in the cryptographic database in encrypted form, wherein reconstructing the wrapping key from the second wrapping key part and the third wrapping key part further comprises decrypting the second wrapping key part and the third wrapping key part after retrieval from the cryptographic database.

In some embodiments, the second wrapping key part and the third wrapping key part are encrypted using a security key associated with the hardware security module.

Embodiments of the present disclosure also provide a computer program product for secure client-side cryptographic key retrieval using cryptographic key splitting and wrapping, the computer program product comprising at least one non-transitory computer readable medium having computer-readable program code portions embodied therein, the computer-readable program code portions comprising executable code portions for receiving a request from a client computing system for a wrapping key split; generating, using a hardware security module, an encryption key associated with the client computing system and a wrapping key; splitting the wrapping key into a plurality of wrapping key parts using a cryptographic algorithm, the plurality of wrapping key parts comprising a first wrapping key part, a second wrapping key part, and a third wrapping key part; transmitting the first wrapping key part to the client computing system; and storing the second wrapping key part and the third wrapping key part in a cryptographic database.

In some embodiments, the computer-readable program code portions further comprise executable code portions for receiving a request from the client computing system for access to the encryption key; retrieving the second wrapping key part and the third wrapping key part from the cryptographic database; reconstructing the wrapping key from the second wrapping key part and the third wrapping key part; encrypting the encryption key using the wrapping key to generate a wrapped encryption key; and transmitting the wrapped encryption key and at least one of the second wrapping key part and the third wrapping key part to the client computing system.

In some embodiments, the client computing system is configured to reconstruct a client-side wrapping key from the first wrapping key part and the second wrapping key part; and decrypt the wrapped encryption key using the client-side wrapping key.

In some embodiments, generating the encryption key comprises inputting one or more random bytes and a base key associated with the client computing system into a hash algorithm.

In some embodiments, the second wrapping key part and the third wrapping key part are stored in the cryptographic database in encrypted form, wherein reconstructing the wrapping key from the second wrapping key part and the third wrapping key part further comprises decrypting the second wrapping key part and the third wrapping key part after retrieval from the cryptographic database.

In some embodiments, the second wrapping key part and the third wrapping key part are encrypted using a security key associated with the hardware security module.

Embodiments of the present disclosure also provide a computer-implemented method for secure client-side cryptographic key retrieval using cryptographic key splitting and wrapping, wherein the computer-implemented method comprises receiving a request from a client computing system for a wrapping key split; generating, using a hardware security module, an encryption key associated with the client computing system and a wrapping key; splitting the wrapping key into a plurality of wrapping key parts using a cryptographic algorithm, the plurality of wrapping key parts comprising a first wrapping key part, a second wrapping key part, and a third wrapping key part; transmitting the first wrapping key part to the client computing system; and storing the second wrapping key part and the third wrapping key part in a cryptographic database.

In some embodiments, the computer-implemented method further comprises receiving a request from the client computing system for access to the encryption key; retrieving the second wrapping key part and the third wrapping key part from the cryptographic database; reconstructing the wrapping key from the second wrapping key part and the third wrapping key part; encrypting the encryption key using the wrapping key to generate a wrapped encryption key; and transmitting the wrapped encryption key and at least one of the second wrapping key part and the third wrapping key part to the client computing system.

In some embodiments, generating the encryption key comprises inputting one or more random bytes and a base key associated with the client computing system into a hash algorithm.

In some embodiments, the second wrapping key part and the third wrapping key part are stored in the cryptographic database in encrypted form, wherein reconstructing the wrapping key from the second wrapping key part and the third wrapping key part further comprises decrypting the second wrapping key part and the third wrapping key part after retrieval from the cryptographic database.

In some embodiments, the second wrapping key part and the third wrapping key part are encrypted using a security key associated with the hardware security module.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
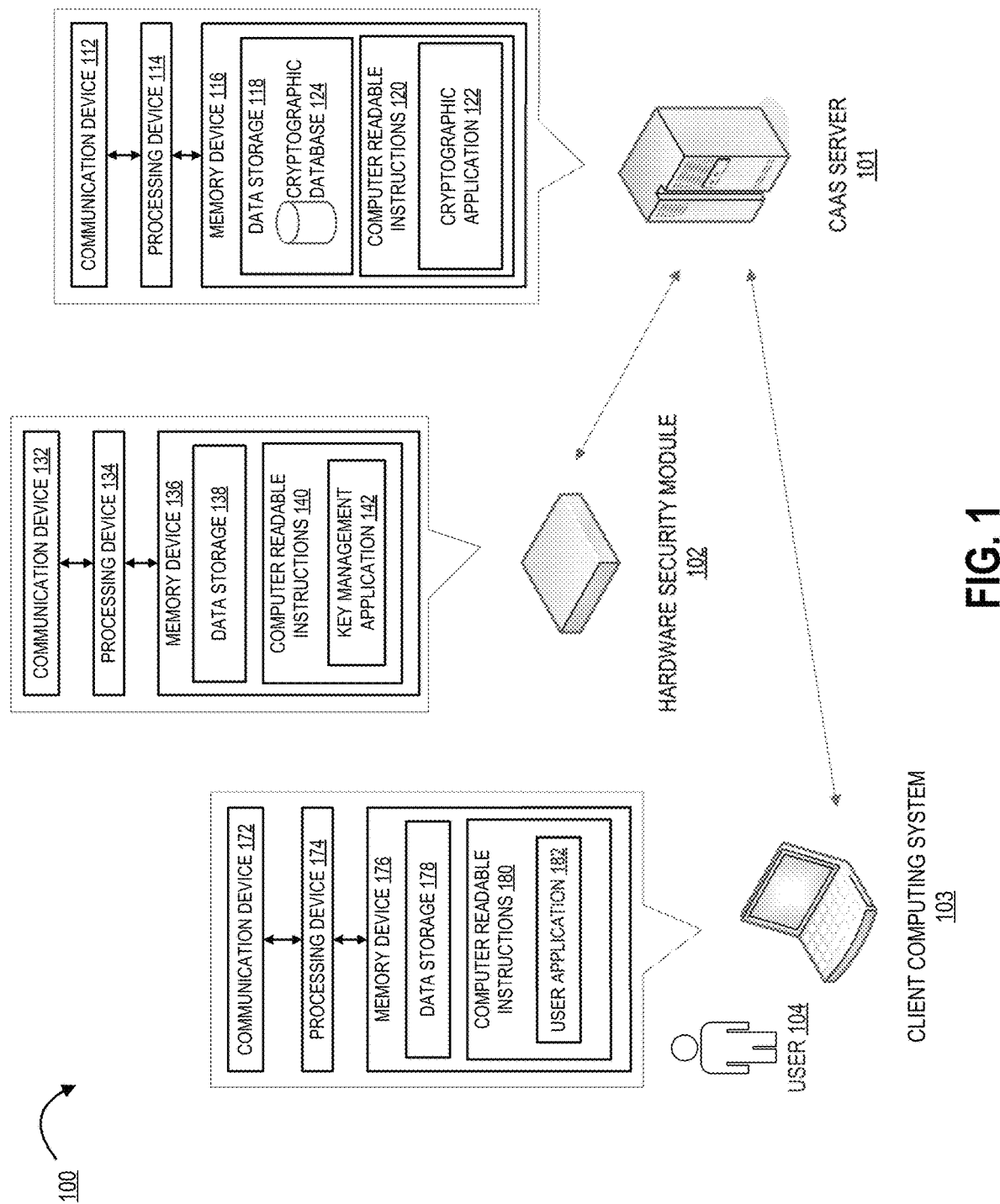

Having thus described embodiments of the invention in general terms, reference will now be made to the accompanying drawings, wherein:

FIG. 1 illustrates an operating environment for the key splitting and wrapping system, in accordance with one embodiment of the present disclosure; and FIG. 2 illustrates a process flow for generating wrapping key parts for an encryption key, in accordance with some embodiments of the present disclosure; and FIG. 3 illustrates a process flow for securely transmitting an encryption key to the client computing system, in accordance with some embodiments of the present disclosure.

DETAILED DESCRIPTION OF EMBODIMENTS
OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to elements throughout. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein.

"Entity" as used herein may refer to an individual or an organization that owns and/or operates an online system of networked computing devices, systems, and/or peripheral devices on which the system described herein is implemented. The entity may be a business organization, a non-profit organization, a government organization, and the like, which may routinely use various types of applications within its enterprise environment to accomplish its organizational objectives.

"Entity system" as used herein may refer to the computing systems, devices, software, applications, communications hardware, and/or other resources used by the entity to perform the functions as described herein. Accordingly, the entity system may comprise desktop computers, laptop computers, servers, Internet-of-Things ("IoT") devices, networked terminals, mobile smartphones, smart devices (e.g., smart watches), network connections, and/or other types of computing systems or devices and/or peripherals along with their associated applications.

"Computing system" or "computing device" as used herein may refer to a networked computing device within the entity system. The computing system may include a processor, a non-transitory storage medium, a communications device, and a display. The computing system may be configured to support user logins and inputs from any combination of similar or disparate devices. Accordingly, the computing system may be a portable electronic device such as a smartphone, tablet, single board computer, smart device, or laptop. In other embodiments, the computing system may be a stationary unit such as a personal desktop computer, networked terminal, IoT device, or the like.

"User" as used herein may refer to an individual who may interact with the entity system to access the functions therein. Accordingly, the user may be an agent, employee, associate, contractor, or other authorized party who may access, use, administrate, maintain, and/or manage the computing systems within the entity system. In other embodiments, the user may be a client or customer of the entity.

Accordingly, the term "user device" or "mobile device" may refer to mobile phones, personal computing devices, tablet computers, wearable devices, and/or any stationary or portable electronic device capable of receiving and/or storing data therein.

"Cryptographic function" or "cryptographic algorithm" as used herein may refer to a set of logical and/or mathematical operations or processes that may be executed on a specified segment of data to produce a cryptographic output (or "cypher"). In some embodiments, the cryptographic algorithm may be an algorithm such as Rivest-Shamir-Adleman ("RSA"), Shamir's Secret Sharing ("SSS"), or the like. In other embodiments, the cryptographic algorithm may be a hash algorithm which may, given a specified data input, produce a cryptographic hash output value which is a fixed-length character string. Examples of such hash algorithms may include MD5, Secure Hash Algorithm/SHA, or the like. According, "hashing" or "hashed" as used herein may refer to the process of producing a hash output based on a data input into a hash algorithm.

"Key" or "cryptographic key" as used herein may refer to data (e.g., a character string) which determines the manner in which an input is transformed into an output using a cryptographic algorithm (e.g., an encryption algorithm). Accordingly, "symmetric cryptography" or "symmetric key cryptography" may refer to a process for data encryption by which multiple users and/or devices use the same key to encrypt communications.

The system as described herein provides a way to mitigate the possibility of unauthorized access to sensitive or confidential data. In particular, the system may provide a more secure way to pass encryption keys across computing systems. In this regard, the system may comprise a hardware security module (or "HSM") that may perform functions such as cryptographic key management, encryption/decryption services, authorization and/or authentication services, and the like. The HSM may generate an encryption key, which may be used to encrypt and/or decrypt data (e.g., sensitive data to be protected), and a wrapping key, which may be used to wrap the encryption key to provide an additional layer of security.

The HSM may further use a splitting algorithm (e.g., the SSS algorithm) to divide the wrapping key into a plurality of parts (or "wrapping key parts"), where the wrapping key may be reconstructed using fewer than the total number of parts. Accordingly, the system may set a threshold which specifies minimum number of parts needed to reconstruct the wrapping key. For instance, if the system divides the wrapping key into three parts, the system may require that at least two parts are required in order to reconstruct the wrapping key. It will be appreciated by those skilled in the art that the total number of parts and/or the threshold may be adjusted according to considerations such as data protection requirements, system architectures, allocation of computing resources, and the like. For example, in some embodiments, the wrapping key may be split into ten parts, whereas the threshold is set to seven parts.

Once the wrapping key parts have been generated, the system may transmit one or more wrapping key parts to a client computing system and store the remaining wrapping key parts within a cryptographic database, which may comprise a repository for storing wrapping key parts. In an exemplary embodiment, the wrapping key may be split into three wrapping key parts. A first wrapping key part may be transmitted and stored on the client computing system, while the second and third wrapping key parts are stored in the cryptographic database. In some embodiments, the wrapping key parts and/or reconstructed encryption keys may be stored in the cryptographic database in encrypted form (e.g., by using a security key held by the HSM).

Subsequently, the client computing system may submit a request to the system to regenerate and/or retrieve the encryption key (e.g., so that the client computing system may use the encryption key to gain authorized access to protected data). Upon receiving the request, the system may access the wrapping key parts stored in the cryptographic database and reconstruct the wrapping key from the wrapping key parts. It should be appreciated that even if the cryptographic database does not store all of the wrapping key parts (e.g., three wrapping key parts), so long as the cryptographic database stores a number of wrapping key parts that meet or exceed the threshold (e.g., at least two wrapping key parts), the system will be able to reconstruct the wrapping key.

Once the wrapping key has been reconstructed, the system may use the wrapping key to wrap (or encapsulate) the encryption key (which in some embodiments may be stored within the cryptographic database in encrypted form). If the encryption key is stored in encrypted form, the HSM may first decrypt the encrypted encryption key using the security key of the HSM. By wrapping the encryption key using the wrapping key, the system may ensure that the encryption key remains protected as the encryption key is transmitted to authorized computing systems (e.g., the client computing system). The system may then transmit the wrapped encryption key, along with at least one of the wrapping key parts (e.g., the second or third wrapping key part), to the client computing system.

The client computing system may, using the wrapping key parts received from the HSM during the key generation process (e.g., the first wrapping key part) in conjunction with the wrapping key parts received along with the encryption key (e.g., the second or third wrapping key part), the client computing system may reconstruct the wrapping key. Again, it should be noted that so long as the client computing system receives at least the minimum number of wrapping key parts (e.g., two), the client computing system may be able to reconstruct the wrapping key from the partial pool of wrapping key parts. Once the client computing system reconstructs the wrapping key, the client computing system may use the wrapping key to unwrap (or decrypt) the encryption key, which then becomes available for encrypting/decrypting the data records associated with the encryption key.

The system as described herein confers a number of technological advantages over conventional data security systems. In particular, by storing encryption keys in encrypted form and decrypting the keys on an as-needed basis, the system may reduce the incidence of unauthorized access to the encryption keys. Furthermore, by performing the splitting and reconstruction of wrapping keys used to wrap encryption keys, the system may help ensure the security of encryption keys as they are transferred to authorized parties over a network.

Turning now to the figures, FIG. 1 illustrates an operating environment 100 for the key splitting and wrapping system, in accordance with one embodiment of the present disclosure. In particular, FIG. 1 illustrates a cryptography-as-a-service ("CAAS") server 101 that is operatively coupled, via a network, to a hardware security module 102 and/or a client computing system 103. In such a configuration, the CAAS server 101 may transmit information to and/or receive information from the hardware security module 102 and/or the client computing system 103.

It should be understood by one skilled in the art that FIG. 1 illustrates only an exemplary embodiment of the operating environment 100, and it will be appreciated that the operating environment 100 may comprise a fewer or greater number of computing systems and/or devices than are depicted in FIG. 1. For instance, though a single client computing system 103 is depicted, the operating environment 100 may comprise multiple client computing systems 103 that may access the functions of the system described herein. It should also be understood that one or more functions of the systems, devices, or servers as depicted in FIG. 1 may be combined into a single system, device, or server. For instance, in some embodiments, the functions of the hardware security module 102 may be performed by the CAAS server 101. Furthermore, a single system, device, or server as depicted in FIG. 1 may represent multiple systems, devices, or servers. For instance, though the CAAS server 101 may is depicted as a single computing system, the CAAS server 101 may represent multiple servers operating in a federated manner.

The network may be a system specific distributive network receiving and distributing specific network feeds and identifying specific network associated triggers. The network may include one or more cellular radio towers, antennae, cell sites, base stations, telephone networks, cloud networks, radio access networks (RAN), Wi-Fi networks, or the like. Additionally, the network may also include a global area network (GAN), such as the Internet, a wide area network (WAN), a local area network (LAN), or any other type of network or combination of networks. Accordingly, the network may provide for wireline, wireless, or a combination wireline and wireless communication between devices on the network.

As illustrated in FIG. 1, the CAAS server 101 may be a computing system that performs encryption and/or decryption processes on an as-needed basis (or "as a service") to authorized computing systems (e.g., the hardware security module 102 and/or the client computing system 103). Accordingly, the CAAS server 101 may comprise a processing device 114 operatively coupled to a communication device 112 and a memory device 116 having data storage 118 and computer readable instructions 120 stored thereon.

As used herein, the term "processing device" generally includes circuitry used for implementing the communication and/or logic functions of the particular system. For example, a processing device may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device may include functionality to operate one or more software programs based on computer-readable instructions thereof, which may be stored in a memory device.

The processing device 114 may use the communication device 112 to communicate with the network and other devices on the network, such as, but not limited to the hardware security module 102 and/or the client computing system 103. Accordingly, the communication device 112 generally comprises one or more hardware components such as a modem, antennae, Wi-Fi or Ethernet adapter, radio transceiver, or other device for communicating with other devices on the network.

In some embodiments, the memory device 116 includes data storage 118 for storing data related to the system environment. In this regard, the data storage 118 may comprise a cryptographic database 124, which may be used to store information needed to perform the processes of the CAAS server 101. In this regard, the cryptographic database 124 may be used to store wrapping key parts and/or encryption keys (both of which may be maintained in an encrypted form). The memory device 116 may further have computer-readable instructions 120 stored thereon, where the computer-readable instructions 120 may comprise a cryptographic application 122, which may comprise computer-executable program code which may instruct the processing device 114 to perform certain logic, data processing, and data storing functions of the application to accomplish the entity's objectives. For instance, the cryptographic application 122 may contain executable portions for performing encryption and/or decryption of data (e.g., the wrapping key parts and/or the encryption keys), perform wrapping of encryption keys, transmit and/or retrieve data from the hardware security module 102 and/or the client computing system 103, and the like. In some embodiments, the cryptographic application 122 may further provide a user interface (e.g., a web server) comprising one or more interface elements with which the client computing system 103 may interact to access the functions described above.

As further illustrated in FIG. 1, the operating environment 100 may further comprise a hardware security module 102 in operative communication with the CAAS server 101. In particular, the hardware security module 102 may be a computing system that may perform the key generation and management functions described herein. Accordingly, the hardware security module 102 may be a computing system such as a server or networked terminal, though it is within the scope of the disclosure for the hardware security module 102 to be a device such as a desktop computer, laptop, IoT device, smartphone, tablet, single-board computer, router, or the like.

The hardware security module 102 may comprise a processing device 134 operatively coupled to a communication device 132 and a memory device 136 having data storage 138 and computer readable instructions 140 stored thereon, where the computer readable instructions 140 may comprise a key management application 142. The data storage 138 may store various types of information used by the hardware security module 102, such as HSM security keys. The key management application 142 may contain executable code portions for executing processes with respect to key creation and/or management, such as the creation of wrapping keys and/or encryption keys, creation of application-specific base keys, splitting of wrapping keys, and the like.

The operating environment 100 may further comprise a client computing system 103. The client computing system 103 may be a computing system that may be operated by a user 104 to access the data security functions of the system. In this regard, the user 104 may be a user who may request authorized access to encrypt and/or decrypt a set of data. Accordingly, the client computing system 103 may be a computing system such as a desktop computer, laptop computer, smartphone or smart device, tablet, single board computer, or the like, though it is within the scope of the disclosure for the client computing system 103 to be any other kind of computing system as described herein (e.g., a "headless" computing system such as a server). The client computing system 103 may comprise a user interface comprising one or more input devices (e.g., a keyboard, keypad, microphone, mouse, tracking device, biometric readers, capacitive sensors, or the like) and/or output devices (e.g., a display such as a monitor, projector, headset, touchscreen, and/or auditory output devices such as speakers, headphones, or the like) for interacting with the user 104.

The client computing system 103 may comprise a processing device 174 operatively coupled to a communication device 172 and a memory device 176, the memory device 176 comprising data storage 178 and computer readable instructions 180. The computer readable instructions 180 may comprise a user application 182, which in some embodiments may be an application with a graphical interface that may allow the user 104 to access the functions of the CAAS server 101 and/or the hardware security module 102. In this regard, the user application 182 may allow the user 104 to transmit requests to retrieve an encryption key associated with the client computing system 103 and/or the user application, perform encryption and/or decryption of data, and the like.

The communication devices as described herein may comprise a wireless local area network (WLAN) such as Wi-Fi based on the Institute of Electrical and Electronics Engineers' (IEEE) 802.11 standards, Bluetooth short-wavelength UHF radio waves in the ISM band from 2.4 to 2.485 GHz or other wireless access technology. Alternatively or in addition to the wireless interface, the computing systems may also include a communication interface device that may be connected by a hardwire connection to the resource distribution device. The interface device may comprise a connector such as a USB, SATA, PATA, SAS or other data connector for transmitting data to and from the respective computing system.

The computing systems described herein may each further include a processing device communicably coupled to devices as a memory device, output devices, input devices, a network interface, a power source, a clock or other timer, a camera, a positioning system device, a gyroscopic device, one or more chips, and the like.

In some embodiments, the computing systems may access one or more databases or datastores (not shown) to search for and/or retrieve information related to the service provided by the entity. The computing systems may also access a memory and/or datastore local to the various computing systems within the operating environment 100.

The processing devices as described herein may include functionality to operate one or more software programs or applications, which may be stored in the memory device. For example, a processing device may be capable of operating a connectivity program, such as a web browser application. In this way, the computing systems may transmit and receive web content, such as, for example, product valuation, service agreements, location-based content, and/or other web page content, according to a Wireless Application Protocol (WAP), Hypertext Transfer Protocol (HTTP), and/or the like.

A processing device may also be capable of operating applications. The applications may be downloaded from a server and stored in the memory device of the computing systems. Alternatively, the applications may be pre-installed and stored in a memory in a chip.

The chip may include the necessary circuitry to provide integration within the devices depicted herein. Generally, the chip will include data storage which may include data associated with the service that the computing systems may be communicably associated therewith. The chip and/or data storage may be an integrated circuit, a microprocessor, a system-on-a-chip, a microcontroller, or the like. In this way, the chip may include data storage. Of note, it will be apparent to those skilled in the art that the chip functionality may be incorporated within other elements in the devices.

For instance, the functionality of the chip may be incorporated within the memory device and/or the processing device. In a particular embodiment, the functionality of the chip is incorporated in an element within the devices. Still further, the chip functionality may be included in a removable storage device such as an SD card or the like.

A processing device may be configured to use the network interface to communicate with one or more other devices on a network. In this regard, the network interface may include an antenna operatively coupled to a transmitter and a receiver (together a "transceiver"). The processing device may be configured to provide signals to and receive signals from the transmitter and receiver, respectively. The signals may include signaling information in accordance with the air interface standard of the applicable cellular system of the wireless telephone network that may be part of the network. In this regard, the computing systems may be configured to operate with one or more air interface standards, communication protocols, modulation types, and access types. By way of illustration, the devices may be configured to operate in accordance with any of a number of first, second, third, fourth, and/or fifth-generation communication protocols and/or the like. For example, the computing systems may be configured to operate in accordance with second-generation (2G) wireless communication protocols IS-136 (time division multiple access (TDMA)), GSM (global system for mobile communication), and/or IS-95 (code division multiple access (CDMA)), or with third-generation (3G) wireless communication protocols, such as Universal Mobile Telecommunications System (UMTS), CDMA2000, wideband CDMA (WCDMA) and/or time division-synchronous CDMA (TD-SCDMA), with fourth-generation (4G) wireless communication protocols, with fifth-generation (5G) wireless communication protocols, or the like. The devices may also be configured to operate in accordance with non-cellular communication mechanisms, such as via a wireless local area network (WLAN) or other communication/data networks.

The network interface may also include an application interface in order to allow a user or service provider to execute some or all of the above-described processes. The application interface may have access to the hardware, e.g., the transceiver, and software previously described with respect to the network interface. Furthermore, the application interface may have the ability to connect to and communicate with an external data storage on a separate system within the network.

The devices may have an interface that includes user output devices and/or input devices. The output devices may include a display (e.g., a liquid crystal display (LCD) or the like) and a speaker or other audio device, which are operatively coupled to the processing device. The input devices, which may allow the devices to receive data from a user, may include any of a number of devices allowing the devices to receive data from a user, such as a keypad, keyboard, touch-screen, touchpad, microphone, mouse, joystick, other pointer device, button, soft key, and/or other input device(s).

The devices may further include a power source. Generally, the power source is a device that supplies electrical energy to an electrical load. In some embodiment, power source may convert a form of energy such as solar energy, chemical energy, mechanical energy, or the like to electrical energy. Generally, the power source may be a battery, such as a lithium battery, a nickel-metal hydride battery, or the like, that is used for powering various circuits, e.g., the transceiver circuit, and other devices that are used to operate the devices. Alternatively, the power source may be a power adapter that can connect a power supply from a power outlet to the devices. In such embodiments, a power adapter may be classified as a power source "in" the devices.

As described above, the computing devices as shown in FIG. 1 may also include a memory device operatively coupled to the processing device. As used herein, "memory" may include any computer readable medium configured to store data, code, or other information. The memory device may include volatile memory, such as volatile Random-Access Memory (RAM) including a cache area for the temporary storage of data. The memory device may also include non-volatile memory, which can be embedded and/or may be removable. The non-volatile memory may additionally or alternatively include an electrically erasable programmable read-only memory (EEPROM), flash memory or the like.

The memory device may store any of a number of applications or programs which comprise computer-executable instructions/code executed by the processing device to implement the functions of the devices described herein.

The computing systems may further comprise a gyroscopic device. The positioning system, input device, and the gyroscopic device may be used in correlation to identify phases within a service term.

Each computing system may also have a control system for controlling the physical operation of the device. The control system may comprise one or more sensors for detecting operating conditions of the various mechanical and electrical systems that comprise the computing systems or of the environment in which the computing systems are used. The sensors may communicate with the processing device to provide feedback to the operating systems of the device. The control system may also comprise metering devices for measuring performance characteristics of the computing systems. The control system may also comprise controllers such as programmable logic controllers (PLC), proportional integral derivative controllers (PID) or other machine controllers. The computing systems may also comprise various electrical, mechanical, hydraulic or other systems that perform various functions of the computing systems. These systems may comprise, for example, electrical circuits, motors, compressors, or any system that enables functioning of the computing systems.

FIG. 2 illustrates a process flow 200 for generating wrapping key parts for an encryption key, in accordance with some embodiments of the present disclosure. The process begins at block 201, where the system receives a request, from a client computing system, for a wrapping key split. The client computing system may be operated by a user who may be authorized to access the system described herein to encrypt and/or decrypt data. In this regard, the client computing system and/or user may be onboarded by the system, where the system may generate a unique base key associated with the client computing system. The base key may then be stored in the HSM such that the base key is subsequently used with respect to system interactions with the particular client computing system. Furthermore, the base key metadata (e.g., system information, user information, permissions and/or authorizations, and the like) may be stored within the cryptographic database.

The process continues to block 202, where the system generates, using a hardware security module, an encryption key associated with the client computing system and a wrapping key. The encryption key may, in some embodiments, be a symmetric cryptographic key that allows the client computing system to encrypt data and/or decrypt data that has been encrypted using the encryption key. In this regard, the system may generate the encryption key by inputting the base key associated with the client computing system and/or one or more random bytes (e.g., nonce values) into a cryptographic algorithm (e.g., a hash algorithm). Accordingly, each encryption key generated by the system may be unique to a particular client computing system. In some embodiments, the encryption key may be stored in an encrypted form within the cryptographic database. In such embodiments, the encryption key may be encrypted before being stored in the cryptographic database and/or decrypted before being wrapped and transmitted to the user. The wrapping key may be a symmetric key generated by the HSM which is subsequently used to wrap (or encapsulate) data being stored and/or transmitted within a network.

The process continues to block 203, where the system splits the wrapping key into a plurality of wrapping key parts using a cryptographic algorithm. In some embodiments, the cryptographic algorithm may be Shamir's Secret Sharing algorithm, which may allow a complete copy of the wrapping key to be reconstructed from fewer than the total number of wrapping key parts generated using the algorithm. For instance, if three wrapping key parts are generated, the system may configure the algorithm such that a full copy of the wrapping key may be generated by a threshold number of wrapping key parts (e.g., two wrapping key parts). It should be understood that the total number of wrapping key parts and the threshold number of wrapping key parts may be selected by the system according to considerations such as processing efficiency, security needs, computing resources such as memory or storage space, network speed and/or latency, and the like.

The process continues to block 204, where the system transmits a first wrapping key part from the plurality of wrapping key parts to the client computing system. Once the wrapping key parts are created from the split of the wrapping key, the system may send at least one wrapping key part to the client computing system for storage. Subsequently, the client computing system may recall the wrapping key part(s) received from the system to be used in reconstructing the wrapping key on the client side, which is explained in further detail elsewhere herein.

The process continues to block 205, where the system stores a second wrapping key part and a third wrapping key part from the plurality of wrapping key parts in a cryptographic database. By storing the wrapping key parts in the cryptographic database, the system may reconstruct a server-side copy of the wrapping key using the wrapping key parts stored in the cryptographic database, as explained in further detail herein. In some embodiments, the wrapping key parts may be stored in the cryptographic database in encrypted form. In such embodiments, the wrapping key parts may be encrypted by the system before being stored in the cryptographic database and/or decrypted before being used to reconstruct the server-side wrapping key.

FIG. 3 illustrates a process flow 300 for securely transmitting an encryption key to the client computing system, in accordance with some embodiments of the present disclosure. The process begins at block 301, where the system receives a request, from a client computing system, for access to the encryption key. The client computing key may request the encryption key, for instance, to gain authorized access to data that may have been encrypted using the encryption key (e.g., personal information associated with an authorized user). In this regard, the user may use an application stored on the client computing system to access an interface through which the user may submit requests to the system (e.g., to complete onboarding, generate encryption keys and/or wrapping keys, retrieve encryption keys and/or wrapping key parts, and the like).

The process continues to block 302, where the system retrieves the plurality of wrapping key parts and the encryption key from the cryptographic database. In embodiments in which the information within the cryptographic database is stored in encrypted form, the system may decrypt the wrapping key parts after retrieval from the cryptographic database. In some embodiments, the wrapping key parts may be those remaining wrapping key parts that were not sent to the client computing system upon creation of the plurality of wrapping key parts.

The process continues to block 303, where the system reconstructs the wrapping key from the second wrapping key part and the third wrapping key part. It should be noted that even though the plurality of wrapping key parts comprises more than the second wrapping key part and the third wrapping key part, the two wrapping key parts may nevertheless be enough to reconstitute the server-side wrapping key.

The process continues to block 304, where the system encrypts the encryption key using the wrapping key to generate a wrapped encryption key. In this regard, the wrapping key may be generated by the HSM and used by the system to wrap the encryption key. By wrapping the encryption key using the wrapping key, the contents of the encryption key may be hidden as the encryption key is stored and/or transmitted across the network (e.g., to the client computing system).

The process concludes at block 305, where the system transmits the wrapped encryption key and at least one of the second wrapping key part and the third wrapping key part to the client computing system. At this stage, the system sends the wrapped encryption key and a requisite number of wrapping key parts to satisfy the wrapping key threshold such that the wrapping key may be reconstructed on the client side. For example, the system may transmit the wrapped encryption key along with the second wrapping key part. Once the client computing system receives the wrapped encryption key and the second wrapping key part, the client computing system may reconstruct a client-side copy of the wrapping key using the first wrapping key part (which was received earlier and stored by the client computing system) with the second wrapping key part. Once the client-side wrapping key is generated, the client computing system may use the client-side wrapping key to decrypt the wrapped encryption key to generate a decrypted encryption key. Accordingly, the decrypted encryption key may be used by the client computing system to encrypt and/or decrypt data on as-needed basis.

Each communication interface described herein generally includes hardware, and, in some instances, software, that enables the computer system, to transport, send, receive, and/or otherwise communicate information to and/or from the communication interface of one or more other systems on the network. For example, the communication interface of the user input system may include a wireless transceiver, modem, server, electrical connection, and/or other electronic device that operatively connects the user input system to another system. The wireless transceiver may include a radio circuit to enable wireless transmission and reception of information.

As will be appreciated by one of ordinary skill in the art, the present invention may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present invention may take the form of an entirely software embodiment (including firmware, resident software, microcode, and the like), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein.

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EEPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out the specialized operations of the present invention may be required on the specialized computer include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F #.

Embodiments of the present invention are described above with reference to flowcharts and/or block diagrams. It will be understood that steps of the processes described herein may be performed in orders different than those illustrated in the flowcharts. In other words, the processes represented by the blocks of a flowchart may, in some embodiments, be in performed in an order other that the order illustrated, may be combined or divided, or may be performed simultaneously. It will also be understood that the blocks of the block diagrams illustrated, in some embodiments, merely conceptual delineations between systems and one or more of the systems illustrated by a block in the block diagrams may be combined or share hardware and/or software with another one or more of the systems illustrated by a block in the block diagrams. Likewise, a device, system, apparatus, and/or the like may be made up of one or more devices, systems, apparatuses, and/or the like. For example, where a processor is illustrated or described herein, the processor may be made up of a plurality of microprocessors or other processing devices which may or may not be coupled to one another. Likewise, where a memory is illustrated or described herein, the memory may be made up of a plurality of memory devices which may or may not be coupled to one another.

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for secure client-side cryptographic key retrieval using cryptographic key splitting and wrapping, the system comprising:
   a memory device with computer-readable program code stored thereon;
   a communication device; and
   a processing device operatively coupled to the memory device and the communication device, wherein the processing device is configured to execute the computer-readable program code to:
   receive a request from a client computing system for a wrapping key split;
   generate, using a hardware security module, an encryption key associated with the client computing system and a wrapping key;
   split the wrapping key into a plurality of wrapping key parts using a cryptographic algorithm, the plurality of wrapping key parts comprising a first wrapping key part, a second wrapping key part, and a third wrapping key part;
   transmit the first wrapping key part to the client computing system;
   store the second wrapping key part and the third wrapping key part in a cryptographic database;
   receive a request from the client computing system for access to the encryption key;
   retrieve the second wrapping key part and the third wrapping key part from the cryptographic database;
   reconstruct the wrapping key from the second wrapping key part and the third wrapping key part;
   encrypt the encryption key using the wrapping key to generate a wrapped encryption key; and
   transmit the wrapped encryption key and at least one of the second wrapping key part and the third wrapping key part to the client computing system.

2. The system according to claim 1, wherein the client computing system is configured to:
   reconstruct a client-side wrapping key from the first wrapping key part and the second wrapping key part; and
   decrypt the wrapped encryption key using the client-side wrapping key.

3. The system according to claim 1, wherein generating the encryption key comprises inputting one or more random bytes and a base key associated with the client computing system into a hash algorithm.

4. The system according to claim 1, wherein the second wrapping key part and the third wrapping key part are stored in the cryptographic database in encrypted form, wherein reconstructing the wrapping key from the second wrapping key part and the third wrapping key part further comprises decrypting the second wrapping key part and the third wrapping key part after retrieval from the cryptographic database.

5. The system according to claim 4, wherein the second wrapping key part and the third wrapping key part are encrypted using a security key associated with the hardware security module.

6. A computer program product for secure client-side cryptographic key retrieval using cryptographic key splitting and wrapping, the computer program product comprising at least one non-transitory computer readable medium having computer-readable program code portions embodied therein, the computer-readable program code portions comprising executable code portions for:
   receiving a request from a client computing system for a wrapping key split;
   generating, using a hardware security module, an encryption key associated with the client computing system and a wrapping key;
   splitting the wrapping key into a plurality of wrapping key parts using a cryptographic algorithm, the plurality of wrapping key parts comprising a first wrapping key part, a second wrapping key part, and a third wrapping key part;
   transmitting the first wrapping key part to the client computing system; and
   storing the second wrapping key part and the third wrapping key part in a cryptographic database;
   receiving a request from the client computing system for access to the encryption key;
   retrieving the second wrapping key part and the third wrapping key part from the cryptographic database;
   reconstructing the wrapping key from the second wrapping key part and the third wrapping key part;
   encrypting the encryption key using the wrapping key to generate a wrapped encryption key; and transmitting the wrapped encryption key and at least one of the second wrapping key part and the third wrapping key part to the client computing system.

7. The computer program product according to claim 6, wherein the client computing system is configured to:
reconstruct a client-side wrapping key from the first wrapping key part and the second wrapping key part; and
decrypt the wrapped encryption key using the client-side wrapping key.

8. The computer program product according to claim 6, wherein generating the encryption key comprises inputting one or more random bytes and a base key associated with the client computing system into a hash algorithm.

9. The computer program product according to claim 6, wherein the second wrapping key part and the third wrapping key part are stored in the cryptographic database in encrypted form, wherein reconstructing the wrapping key from the second wrapping key part and the third wrapping key part further comprises decrypting the second wrapping key part and the third wrapping key part after retrieval from the cryptographic database.

10. The computer program product according to claim 9, wherein the second wrapping key part and the third wrapping key part are encrypted using a security key associated with the hardware security module.

11. A computer-implemented method for secure client-side cryptographic key retrieval using cryptographic key splitting and wrapping, wherein the computer-implemented method comprises:
receiving a request from a client computing system for a wrapping key split;
generating, using a hardware security module, an encryption key associated with the client computing system and a wrapping key;
splitting the wrapping key into a plurality of wrapping key parts using a cryptographic algorithm, the plurality of wrapping key parts comprising a first wrapping key part, a second wrapping key part, and a third wrapping key part;
transmitting the first wrapping key part to the client computing system; and
storing the second wrapping key part and the third wrapping key part in a cryptographic database;
receiving a request from the client computing system for access to the encryption key;
retrieving the second wrapping key part and the third wrapping key part from the cryptographic database;
reconstructing the wrapping key from the second wrapping key part and the third wrapping key part;
encrypting the encryption key using the wrapping key to generate a wrapped encryption key; and
transmitting the wrapped encryption key and at least one of the second wrapping key part and the third wrapping key part to the client computing system.

12. The computer-implemented method according to claim 11, wherein the client computing system is configured to:
reconstruct a client-side wrapping key from the first wrapping key part and the second wrapping key part; and
decrypt the wrapped encryption key using the client-side wrapping key.

13. The computer-implemented method according to claim 11, wherein generating the encryption key comprises inputting one or more random bytes and a base key associated with the client computing system into a hash algorithm.

14. The computer-implemented method according to claim 11, wherein the second wrapping key part and the third wrapping key part are stored in the cryptographic database in encrypted form, wherein reconstructing the wrapping key from the second wrapping key part and the third wrapping key part further comprises decrypting the second wrapping key part and the third wrapping key part after retrieval from the cryptographic database.

15. The computer-implemented method according to claim 14, wherein the second wrapping key part and the third wrapping key part are encrypted using a security key associated with the hardware security module.

* * * * *